US012124720B2

(12) United States Patent
Mienkina et al.

(10) Patent No.: US 12,124,720 B2
(45) Date of Patent: Oct. 22, 2024

(54) MEMORY CONFIGURATION WITHIN A DATA PROCESSING SYSTEM

(71) Applicant: NXP USA, Inc., Austin, TX (US)

(72) Inventors: Martin Mienkina, Bystrice Nad Olsi (CZ); Osvaldo Israel Romero Cortez, Munich (DE); Carl Culshaw, Wigan (GB); Guillaume Perret, Unterfoehring (DE)

(73) Assignee: NXP USA, Inc., Austin, TX (US)

( * ) Notice: Subject to any disclaimer, the term of this patent is extended or adjusted under 35 U.S.C. 154(b) by 203 days.

(21) Appl. No.: 17/656,286

(22) Filed: Mar. 24, 2022

(65) Prior Publication Data
US 2023/0305725 A1  Sep. 28, 2023

(51) Int. Cl.
G06F 3/00 (2006.01)
G06F 3/06 (2006.01)
G06F 8/65 (2018.01)

(52) U.S. Cl.
CPC .......... G06F 3/0644 (2013.01); G06F 3/061 (2013.01); G06F 3/0629 (2013.01); G06F 3/0673 (2013.01); G06F 8/65 (2013.01)

(58) Field of Classification Search
None
See application file for complete search history.

(56) References Cited

U.S. PATENT DOCUMENTS 8,402,259 B2 *  3/2013  Sainath ............. G06F 11/106
                                                   713/1
8,499,295 B2   7/2013  Selvam 2002/0166053 A1  11/2002  Wilson
2007/0294686 A1  12/2007  Oh
2012/0072897 A1   3/2012  Selvam
2016/0117260 A1   4/2016  Wu et al.
(Continued)

FOREIGN PATENT DOCUMENTS

| CA | 2684743 C | 4/2013 |
| CN | 103677884 A | 3/2014 |
| WO | WOD-2019118130 A1 | 6/2019 |

OTHER PUBLICATIONS

Infopulse: "How to Design Secure OTA Firmware and Software Updates for Modern Vehicles," webpage: https://medium.com/@infopulseglobal_9037/how-to-design-secure-ota-firmware-and-software-updates-for-modern-vehicles-4be15ff064be, May 29, 2019, pp. 1-11.

Primary Examiner — Midys Rojas
(74) Attorney, Agent, or Firm — Joanna G. Geld

(57) ABSTRACT

A System on Chip (SoC) includes a first core coupled to an interconnect; a second core coupled to the interconnect; a memory coupled to the interconnect and including a plurality of evenly sized partitions; and storage circuitry configured to store memory configuration information. The memory configuration information defines a memory configuration and is configured to indicate a series of swappable segments for each core of the SoC by indicating, for each core, a first number of partitions of the memory assigned to each of a first swappable segment and a second swappable segment for the core, the first swappable segment designated as an active segment and the second swappable segment designated as a first backup segment, and an enable indicator to indicate whether or not to assign the first number of partitions to a third swappable segment designated as a second backup segment.

20 Claims, 8 Drawing Sheets

(56) References Cited

U.S. PATENT DOCUMENTS

| | | |
|---|---|---|
| 2019/0042278 A1 | 2/2019 | Pirvu et al. |
| 2020/0285461 A1 | 9/2020 | Kumar et al. |
| 2021/0026620 A1* | 1/2021 | Rosner .................... G06F 8/654 |
| 2021/0089296 A1 | 3/2021 | Banik et al. |

* cited by examiner

| SIGNAL | DESCRIPTION | FIELD SETTING DEFINITION |
|---|---|---|
| OTA_ENABLE | OTA ENABLE | !0xAAAA_AAAA_AAAA_AAAA = OTA DISABLED (DEFAULT) |
| | | 0xAAAA_AAAA_AAAA_AAAA = OTA ENABLED |
| OTA_CONFIG (REQUIRES OTA_ENABLE = 0xA...) | MEMORY CONFIGURATION TEMPLATE A (FIXED) + B00/01/B02 (SWAP) + B10/B11/B12 (SWAP) | BITS [0:7] = A (NUMBER OF FIXED PARTITIONS) |
| | | BITS [8:15] = B00-B01 (NUMBER OF FIRST SWAPPABLE PARTITIONS) |
| | | BITS [16:16] = B02 ENABLE (SECONDARY BACKUP FOR FIRST SWAPPABLE PARTITION ENABLE), [TRUE | FALSE] |
| | | BITS [17:23] = RESERVED |
| | | BITS [24:31] = RESERVED |
| | | BITS [32:39] = B10-B11 (NUMBER OF SECOND SWAPPABLE PARTITIONS) |
| | | BITS [40:40] = B12 ENABLE (SECONDARY BACKUP FOR SECOND SWAPPABLE PARTITION ENABLE), [TRUE | FALSE] |
| | | BITS [41:63] = RESERVED |

FIG. 4

| OTA CONFIGURATION: | A (FIXED) + B00/B01/B02 (SWAP) + B10/B11/B12 (SWAP) | | | | | | | | | | | | | | | |
|---|---|---|---|---|---|---|---|---|---|---|---|---|---|---|---|---|
| SEGMENT: | A | B00 | B01 | B02 | B10 | B11 | B12 | | | | | | | | | |
| PARTITIONS PER SEGMENT: | 2 | 2 | 2 | 1 | 0 | 0 | 0 | | | | | | | | | |
| | ASSIGNMENT | | | | | | | LOGICAL ADDRESS | | ADDRESS | OTA INDICATOR | | | | | | BOOT HEADER |
| PARTITION ID | SIZE (kB) | A | B00 | B01 | B02 | B10 | B11 | B12 | START | END | | B00 ACTIVE | B01 PASSIVE | B02 PASSIVE | B10 ACTIVE | B11 PASSIVE | B12 PASSIVE | ADDRESS |
| PARTITION 0 | 1024 | 2 | | | | | | | 0 | FFFFF | FFFFF7 | | | | | | | 0 |
| PARTITION 1 | 1024 | 1 | 1 | | | | | | 100000 | 1FFFFF | 1FFFFF7 | | | | | | | |
| PARTITION 2 | 1024 | 1 | | 1 | | | | | 200000 | 2FFFFF | 2FFFFF7 | | | | | | | |
| PARTITION 3 | 1024 | | 1 | | | | | | 300000 | 3FFFFF | 3FFFFF7 | PRESENT | | | | | | |
| PARTITION 4 | 1024 | | | 1 | | | | | 400000 | 4FFFFF | 4FFFFF7 | | | | | | | |
| PARTITION 5 | 1024 | | 1 | | | | | | 500000 | 5FFFFF | 5FFFFF7 | | PRESENT | | | | | |
| PARTITION 6 | 1024 | | | | | 1 | | | 600000 | 6FFFFF | 6FFFFF7 | | | | | | | 40000 |
| PARTITION 7 | 1024 | | | | | 1 | | | 700000 | 7FFFFF | 7FFFFF7 | | | PRESENT | | | | |

FIG. 5

| OTA CONFIGURATION: | A (FIXED) + B00/B01/B02 (SWAP) + B10/B11/B12 (SWAP) | | | | | | | | | | | | | | | |
|---|---|---|---|---|---|---|---|---|---|---|---|---|---|---|---|---|
| SEGMENT: | A | | | | | | | | | | | | | | | |
| PARTITIONS PER SEGMENT: | 2 | | | | | | | | | | | | | | | |
| | | ASSIGNMENT | | | | | | | LOGICAL ADDRESS | | | OTA INDICATOR | | | | | | BOOT HEADER |
| PARTITION ID | SIZE (kB) | A | B00 | B01 | B02 | B10 | B11 | B12 | START | END | ADDRESS | B00 ACTIVE | B01 PASSIVE | B02 PASSIVE | B10 ACTIVE | B11 PASSIVE | B12 PASSIVE | ADDRESS |
| | | 2 | 1 | 1 | 1 | 1 | 1 | 1 | | | | | | | | | | |
| PARTITION 0 | 1024 | 1 | | | | | | | 0 | FFFFF | FFFFF7 | | | | | | | 0 |
| PARTITION 1 | 1024 | 1 | | | | | | | 100000 | 1FFFFF | 1FFFFF7 | PRESENT | | | | | | |
| PARTITION 2 | 1024 | | 1 | | | | | | 200000 | 2FFFFF | 2FFFFF7 | | | | | | | |
| PARTITION 3 | 1024 | | | 1 | | | | | 300000 | 3FFFFF | 3FFFFF7 | | PRESENT | | | | | |
| PARTITION 4 | 1024 | | | | 1 | | | | 400000 | 4FFFFF | 4FFFFF7 | | | PRESENT | | | | |
| PARTITION 5 | 1024 | | | | | 1 | | | 500000 | 5FFFFF | 5FFFFF7 | | | | PRESENT | | | 40000 |
| PARTITION 6 | 1024 | | | | | | 1 | | 600000 | 6FFFFF | 6FFFFF7 | | | | | PRESENT | | |
| PARTITION 7 | 1024 | | | | | | | 1 | 700000 | 7FFFFF | 7FFFFF7 | | | | | | PRESENT | |

FIG. 6

MEMORY CONFIGURATION WITHIN A DATA PROCESSING SYSTEM

BACKGROUND

Field

This disclosure relates generally to data processing systems, and more specifically, to memory configuration within a data processing system.

Related Art

Today, many cars include smart devices or components, such as smart microcontrollers, which implement safety-critical systems. One such smart device is an electronic control unit (ECU) which helps drivers in taking control of a car to avoid collisions and accidents. However, devices used for such safety-critical applications require continuous updating to meet high technical requirements for quality, security, and efficiency of functional safety standards. In order to maintain these devices, automotive companies leverage over-the-air (OTA) programming to remotely update the systems. The smart devices must therefore include firmware OTA (FOTA) update support. Smart devices today which support FOTA updates do so with very limited configurability. However, due to the wide range of applications which may require smart devices capable of handling a range of simple to complex FOTA updates (within and in addition to automotive applications), there is a need for smart devices with improved configurability to effectively perform any of the updates.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 illustrates, in diagrammatic form, fields of configuration parameters stored within the configurable memory of FIG. 3, in accordance with one embodiment of the present invention.

FIGS. 5 and 6 illustrate example configurations and corresponding configuration information for the configurable memory of FIG. 3, in accordance with one embodiment of the present invention.

DETAILED DESCRIPTION

In one aspect, the configurable memory of a smart device can be described as including a sum of fixed and swappable memory segments. In the case of a multiple core (multicore) smart device, each type of memory segment can be assigned to one or more cores of the multicore device. The swappable memory segments are available in order to allow for each core to have an active segment as well as two or more backup segments, which provides more flexibility than just having a fixed segment as well as a single swappable segment, in which the single swappable segment only allows for a single backup firmware image on the device for the corresponding core. In one embodiment, configuration information is provided to allow for various different memory configurations, in which, for each core, the memory segments can be set up to allow for multiple firmware backups for FOTA updates. Furthermore, the memory configuration information can be modified, as needed, during a FOTA update.

Figure 1:
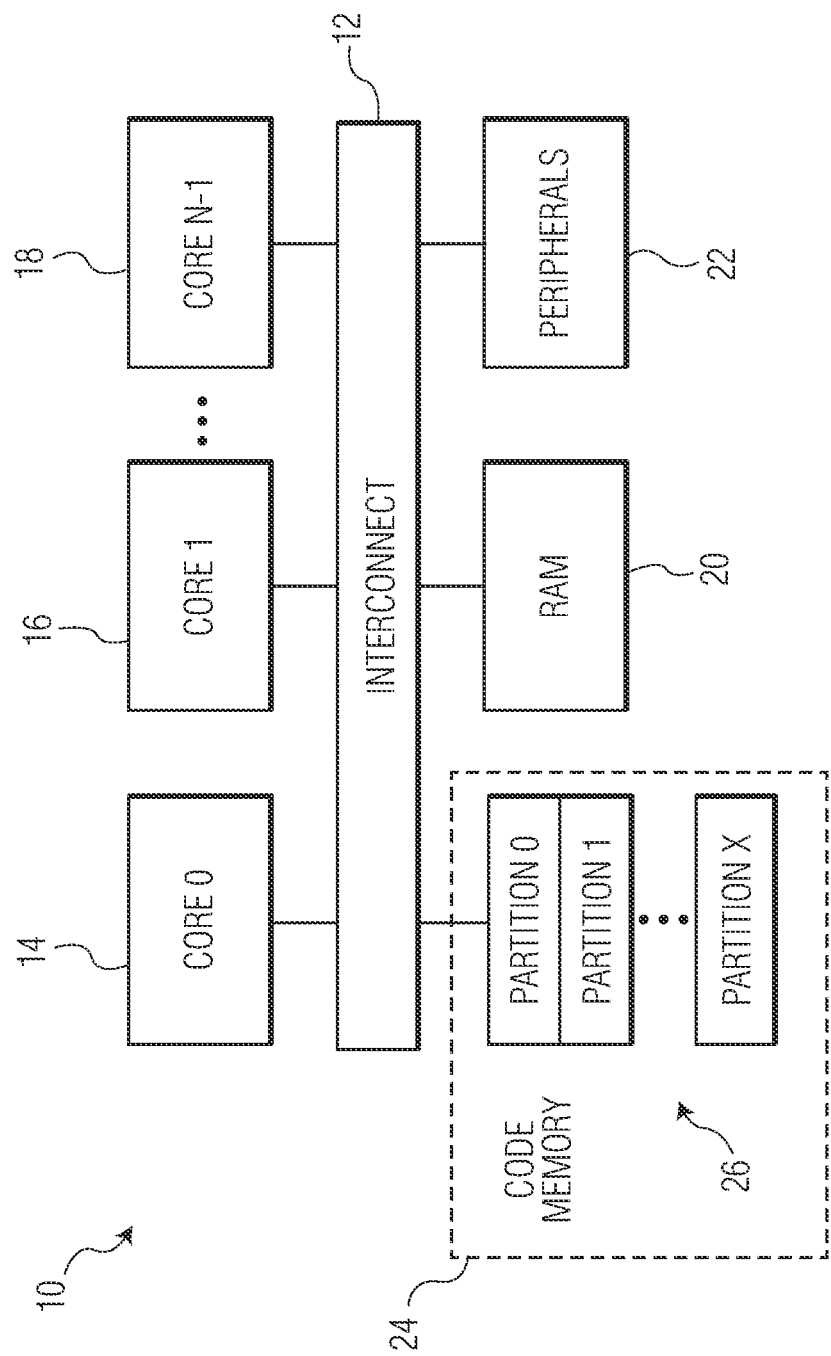
FIG. 1 illustrates, in block diagram form, a device with a configurable memory in accordance with one embodiment of the present invention.

FIG. 1 illustrates, in block diagram form, a system on a chip (SoC) 10, in accordance with one embodiment of the present invention. SoC 10 may also be referred to as an integrated circuit, data processing system, or device, in which SoC 10 may be used to implement a smart device. For example, in one embodiment, SoC 10 is a microcontroller, such as an electronic control unit (ECU), which may be used in a vehicle. Alternatively, SoC 10 can be any type of device used in any type of application. SoC 10 includes N cores, in which N is any integer greater than or equal to one. In one embodiment, N is greater than one such that SoC 10 is a multicore device.

SoC 10 includes an interconnect 12, N cores, including cores 14, 16, and 18, a random access memory (RAM) 20, peripherals 22, and a code memory 24. Each of cores 14, 16, and 18 can simply be referred to as core 0, core 1, core N−1, respectively. Peripherals 22 may include any number and type of peripherals, or may not be present at all. Each of the cores, code memory 24, RAM 20, and peripherals 22 are bidirectionally connected to interconnect 12, which may be implemented as any type of interconnect, such as, for example, a bus, crossbar switch, interconnect fabric, etc. Code memory 24 can be any non-volatile memory (NVM), such as a magnetoresistive RAM (MRAM), flash, etc. Code memory 24 can be used to store software or firmware executed by any of the cores in SoC 10. As will be described in more detail below, code memory 24 can be divided into X+1 memory partitions 26 (partition 0-partition X).

Code memory 24 (also referred to herein as memory 24 or NVM 24) may be configured in a variety of different ways. Each of the X+1 memory partitions can be assigned to a memory segment of memory 24 that is either fixed or swappable within a logical address space of the memory. Therefore, the logical address space of memory 24 includes the sum of all the partitions in the fixed and swappable segments. In one embodiment, each partition has a fixed size. For example, each can be 1024 kilobytes (KB). In one embodiment, a fixed memory segment of memory 24 includes "A" partitions of partitions 26. The fixed memory segment (which may be referred to as segment A) can be used by any of the cores within SoC 10. In one embodiment, the fixed memory segment stores a fixed image including a bootloader, communication drivers, etc. Other partitions of partitions 26 can each be assigned to a corresponding swappable segment, in which a series of swappable segments can be assigned to each core. Each series of swappable segments includes one or more memory partitions to store an active firmware image as well as one or more memory partitions to store one or more backup firmware images.

Figure 2:
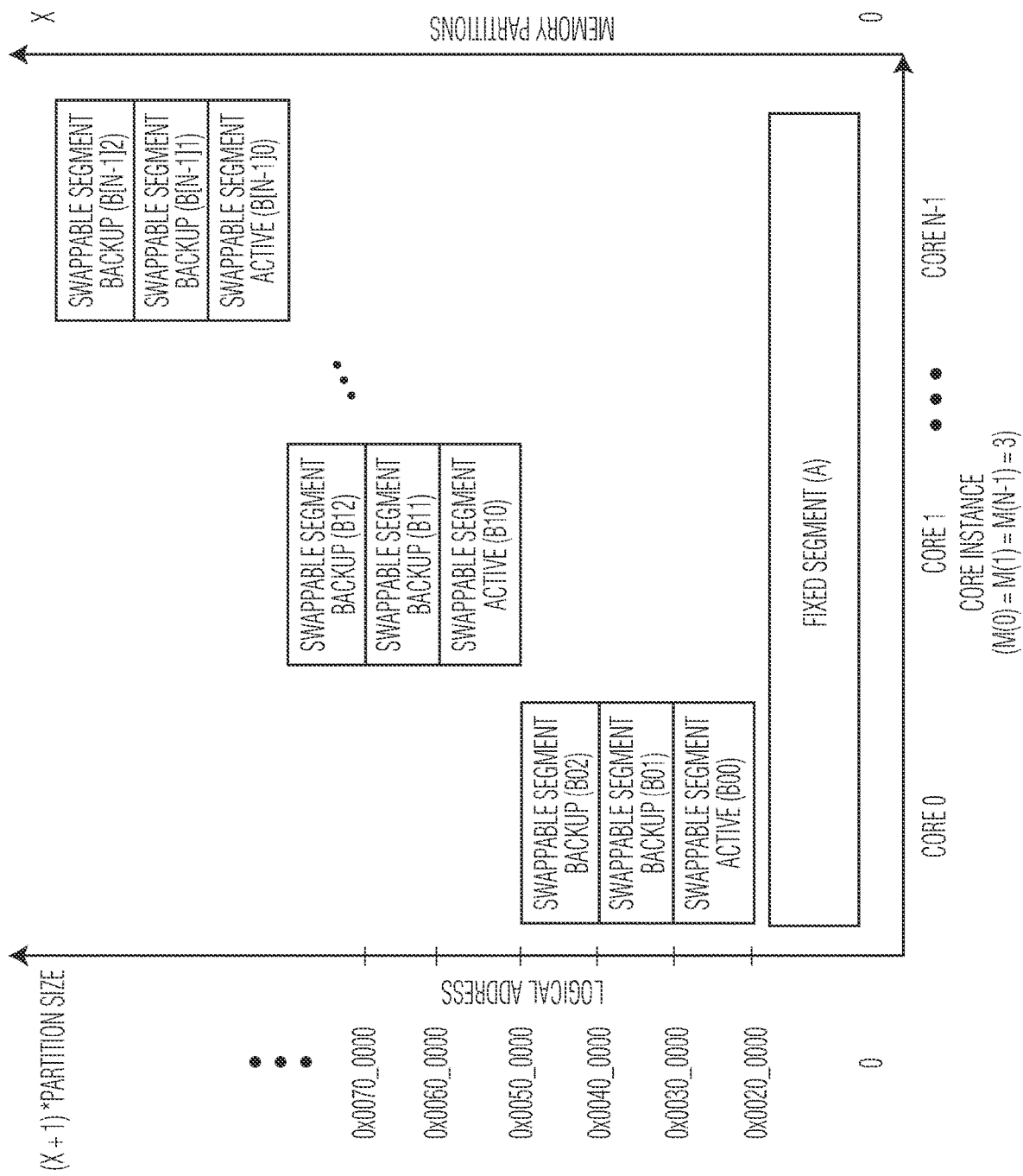
FIG. 2 illustrates, in diagrammatic form, the configurable memory of FIG. 1, in accordance with one embodiment of the present invention.

FIG. 2 illustrates an example configuration for memory 24 for SoC 10. In the illustrated example, SoC 10 includes N cores (core 0, core 1, . . . , core N−1), and each core is assumed to have a corresponding series of three swappable segments. In this example, a first segment of the three swappable segments is intended as an active segment for the corresponding core (to store an active firmware image) while the other two segments of the three swappable segments are intended as passive backup segments for the same corresponding core (to store two backup firmware images for the active firmware image). Each series of swappable segments can include any number of segments, in which one is designated as an active segment and any others as passive segments. In one embodiment, each series of swappable segments includes at least three segments such that any active image for a corresponding core can have at least two corresponding backup images. As used herein, a swappable segment is one which may be designated, as needed, as active or passive.

In the examples herein, M represents the number of swappable segments assigned to each core (i.e. a number of swappable segments in each series of swappable segments). For the example of FIG. 2, is assumed that M(j)=3, in which the index "j" refers to a particular corresponding core of the N cores (and thus a particular corresponding series of swappable segments). Bjk corresponds to the number of partitions assigned to each specific swappable segment, in which the index "j" refers to the corresponding core, and the index "k" refers to a particular swappable segment for the $j^{th}$ core (i.e. within the $j^{th}$ series). For example, in FIG. 2, the series M(0) corresponds to core 0, and includes B00 partitions corresponding to an active swappable segment for core 0, B01 partitions corresponding to a first backup swappable segment for core 0, and B02 partitions corresponding to a second backup swappable segment for core 0. Similarly, the series M(1) corresponds to core 1, and includes B10 partitions corresponding to an active swappable segment for core 1, B11 partitions corresponding to a first backup swappable segment for core 1, and B12 partitions corresponding to a second backup swappable segment for core 1. This continues through the series M(N−1) which corresponds to core N−1, and includes BEN-110 partitions corresponding to an active swappable segment for core N−1, B[N−1]1 partitions corresponding to a first backup swappable segment for core N−1, and B[N−1]2 partitions corresponding to a second backup swappable segment for core N−1. The horizontal axis of FIG. 2 indicates the corresponding core instance for each series, core 0 through core N−1 (in which M(0)=M(1)=M(N−1)=3). Note that in the descriptions herein, each of the swappable segments can simply be referred to as Bjk (e.g. the active swappable segment for core 0 may be referred to as B00, the first backup swappable segment for core 0 as B01, the second backup swappable segment for core 0 as B02, etc.).

As also illustrated in the example of FIG. 2, the 32-bit logical addresses from 0 to ((X+1)* partition size) define the logical address space (as illustrated with the left vertical axis of FIG. 2), in which the fixed segment of A partitions is located at the lowest logical address, followed by the B00, B01, and B02 partitions of M(0), then the B10, B11, and B12 partitions of M(1), and similarly for each of the partitions through B[N−1]0, B[N−1]1, and B[N−1]2 partitions of M(N−1). For example, as seen with the left vertical axis, the fixed segment of A partitions is located starting at 0x0000_0000, B00 starts at 0x0020_0000, B01 starts at 0x0030_0000, B02 starts at 0x0040_0000, etc. As used herein, "0x" preceding a value indicates a hexadecimal value, in which the underscores "_" are simply included to improve readability of the value. In this example, the partitions 0 through X are located in the increasing logical address space (as illustrated on the right vertical axis of FIG. 2).

Figure 3:
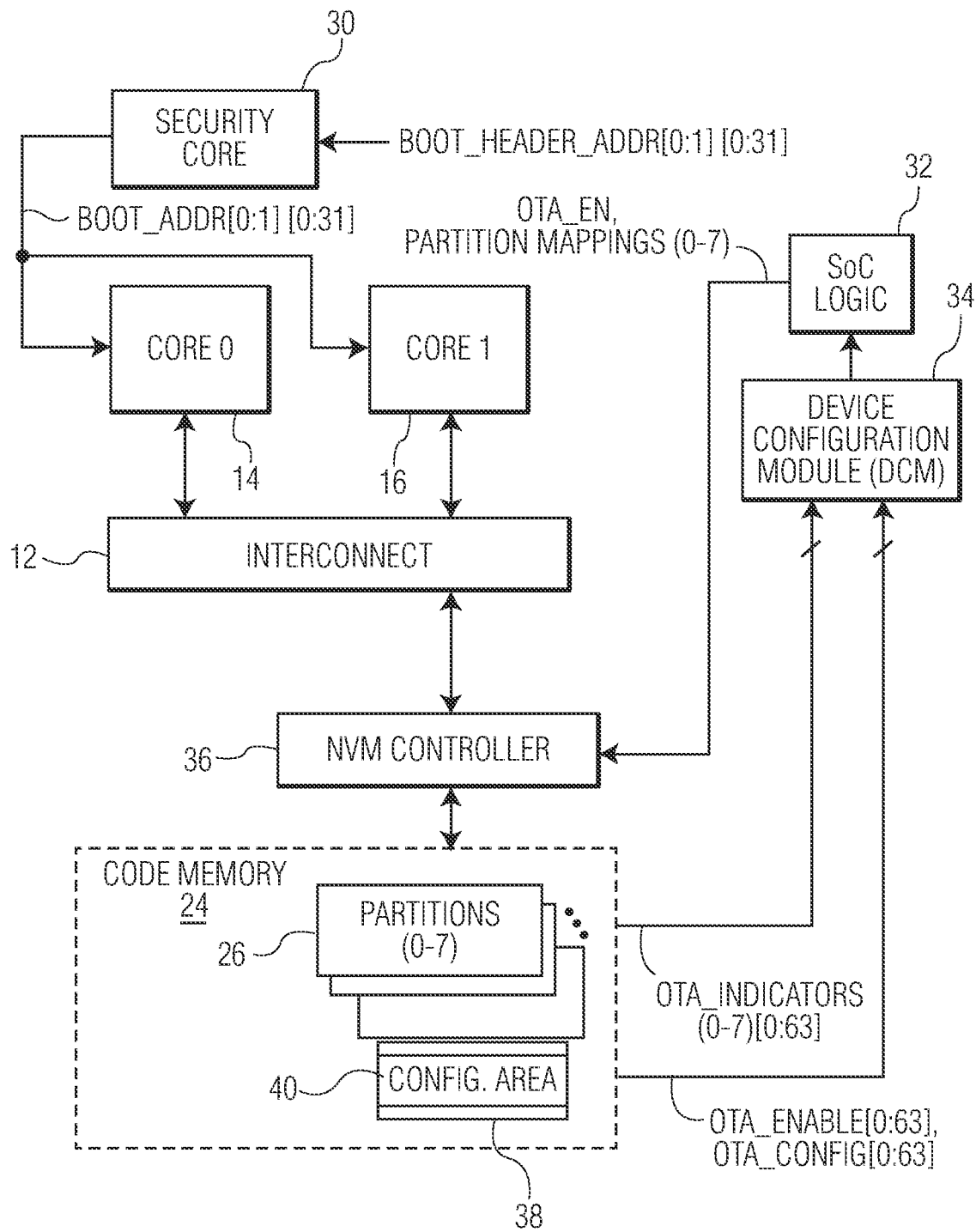
FIG. 3 illustrates, in block diagram form, a more detailed example of the device of FIG. 1, in accordance with one embodiment of the present invention.

FIG. 3 illustrates a more specific example of SoC 10 of FIG. 1, which includes two cores, core 0 and core 1. Also, additional elements are illustrated in FIG. 3 which were not illustrated in FIG. 1, such as an NVM controller 36, a security core 30, SoC logic 32, and a device configuration module (DCM) 34. Note that additional elements such as RAM 20 or any peripherals 22 are not illustrated in FIG. 3 in order to simplify the drawing. In the more specific example of SoC 10 of FIG. 3, X=7, meaning partitions 26 of memory 24 includes a total of 8 partitions, partition 0—partition 7.

Memory 24 also includes an additional memory area 38 which is not considered part of partitions 26. This additional area includes a configuration area 40 which stores configuration information (also referred to as configuration parameters) for memory 24, as will be described in more detail below. As illustrated in FIG. 3, configuration area 40 is stored outside of memory partitions 26 which are impacted by firmware updates because typically, memory configuration information does not change over the course of an application's lifetime, but only during the development phase.

Referring to the block diagram of FIG. 3, memory 24 is configured to store OTA indicators, in which one OTA_indicator is stored for each swappable segment within the last partition of the swappable segment. Therefore, each of the X+1 partitions is capable of storing an OTA_indicator, e.g. OTA_indicator 0-OTA_indicator 7. Each OTA_indicator is stored at a predetermined address within a partition which can be read by DCM 34. In the illustrated embodiment, each OTA_indicator is a 64-bit value, therefore, memory 24 provides OTA_indicators (0-7)[0:63] to DCM 34. However, as will be described below with respect to the examples of FIGS. 5 and 6, only those OTA_indicators stored within a last partition of a swappable segment provide meaningful values describing the swappable segment (e.g. as active or passive). A "last partition" of a swappable segment refers to the partition having a highest partition number, i.e. the partition located at a highest logical address for the swappable segment. Memory 24 also stores an OTA_enable value and an OTA_config value at predetermined addresses in configuration area 40, which can be read by DCM 34. In the illustrated embodiment, each of the OTA_enable value and the OTA_config value is a 64-bit value, therefore, memory 24 provides OTA_enable[0:63] and OTA_config[0:63] to DCM 34. Note that the number of bits in each indicator or value can vary in different embodiments. For example, any of these indicators or values can be implemented using more or fewer bits, as needed for a particular embodiment.

DCM 34 receives configuration information by reading the OTA_indicators, OTA_enable, and OTA_config from the predetermined addresses of partitions 26 and configuration area 40 and communicates information based on these signals to SoC logic 32. SoC logic 32 provides an OTA enable bit (OTA_EN) and partition mapping signals for each partition (partition_mappings (0-7)) to NVM controller 36. NVM controller 36 is bidirectionally coupled to interconnect 12 and memory 24 and controls reads from and writes to memory 24. Security core 30 receives boot header addresses (e.g. boot_header_ADDR(0-1)[0:31] which includes two 32-bit words), and security core 30 boots core 0 and core 1 from addresses provided by a boot header (e.g. boot_ADDR (0-1)[0:31]). Security core 30 can be any type of core which performs security functions and operations for SoC 10. Operation of SoC 10 as illustrated in FIG. 3 will be described in more detail in reference to the examples of FIGS. 4-6 and the flow diagrams of FIGS. 7-8.

FIG. 4 illustrates, in diagrammatic form, various fields which may be used for OTA_enable and for OTA_config, in accordance with one embodiment of the present invention. The OTA_enable is defined as having a 64-bit OTA enable field which is set to any value except 0xAAAA_AAAA_AAAA_AAAA (i.e. !0xAAAA_AAAA_AAAA_AAAA, in which the "!" indicates NOT), indicating OTA updates are disabled or to 0xAAAA_AAAA_AAAA_AAAA indicating that OTA updates are enabled.

The OTA_config provides memory configuration parameters which determine how fixed segment A and swappable segments Bjk are defined (note that use of OTA_config requires that OTA_enable be enabled). For example, the memory configuration template for defining the number of partitions can be provided as: A (for the fixed memory segment)+B00/B01/B02 (for the series of swappable segments for core 0)+B10/B11/B12 (for the series of swappable segments for core 1). In one embodiment, OTA_config includes 64 bits in which bits[0:7] (i.e. OTA_config[0:7]) stores A, which is the number of partitions in the fixed segment. Bits[8:15] (i.e. OTA_config[8:15]) stores B00 which is the number of partitions in a first swappable segment for a first core (e.g. core 0). In this embodiment, 1301=600, in which 1301 is the number of partitions in a second swappable segment for the first core. In one embodiment, the first swappable segment is used as the active swappable segment and the second swappable segment is used as the first backup swappable segment for the first core. Bit[16] (i.e. OTA_config[16]) is an enable bit for B02. If it is asserted (e.g. at a logic level one), a third swappable segment is enabled for the first core. In this case, 1302=1301 in which B02 is the number of partitions in this third swappable segment, which is used as the second backup swappable segment for the first core. Therefore, by enabling B02, it is ensured that there are two swappable backup segments to store two backup firmware images. If the B02 enable bit is negated (e.g. at a logic level zero), this third swappable segment is not enabled for the first core. Bits[32: 40] (i.e. OTA_config[32:40]) are analogous to bits[8:16] but for a second core (e.g. core 1). In an alternate embodiment, instead of an enable bit for B02 or B12 to indicate use of a third backup swappable segment, a field may be provided for each core to indicate a number of partitions for the third swappable segment, in which a zero would indicate that the third swappable segment is not enabled. In the illustrated embodiment, the remaining bits are unused or reserved. In one embodiment, additional fields may be present for one or more of core 2-core N-1.

In one embodiment, the configuration information corresponding to the fields of FIG. 4 are stored in configuration area 40 of memory 24, and can be read by DCM 34 when needed. Note that in alternate embodiments, the configuration information can be stored in configuration area 40 or provided to DCM 34 in different formats. For example, each field may include more or fewer bits, as needed, and may be organized in any order. Also, in the illustrated example, since there are only eight partitions within memory 24, each of the fields for identifying the number of partitions for A, B00 and B10 can be fewer than eight bits. In this example, each of A, B00, and B10 only need to identify a value in the range of 0 to 7. Therefore, fewer than 64 bits may be needed to store the configuration information in memory 24.

FIGS. 5 and 6 provide example memory configurations defined by corresponding configuration information for SoC 10 of FIG. 3, which includes eight partitions and two cores. In these examples, memory 24 uses the range of logical addresses 0 to 0x007F_FFFF for partitions 26, in which each partition is 1024 KB in size. Note that in alternate embodiments, the number of partitions, number of cores, range of logical addresses, and size of the partitions may be different than the example values provided. Also, in the examples of FIGS. 5 and 6, the configuration information for memory 24 results in configuring memory 24 with a series of three swappable segments per core, including one active swappable segment and two backup swappable segments. (Note that the hexadecimal address values in the tables of FIGS. 5 and 6 for the logical start and end addresses, the OTA Indicator addresses, and the boot header addresses are all provided with six hexadecimal digits written in a shorthand form, without underscores and without the leading "0x00," in order to properly fit into the illustrated tables. For example, in tables 5 and 6, the hexadecimal address value "10000" is shorthand for "0x0010_0000", the hexadecimal address value "4FFFF7" is shorthand for "0x004F_FFF7", etc.)

Referring first to FIG. 5, the configuration information is provided at the top of the table, corresponding to the OTA configuration template "A (fixed segment)+1300/B01/B02 (swappable segments)+610/B11/B12 (swappable segments)" described in reference to the fields of FIG. 4. For each of the segments identified as A, B00, B01, B10, and B11, the corresponding number of partitions is listed below the segment, and for the segments identified as B02 and B12, the value below the segment is a true (1) or false (0) for the B02 enable bit and B12 enable bit, respectively. Each of the eight partitions is identified in the left most column with the partition ID 0 to 7. The corresponding size of each partition is identified as 1024 KB. The logical addresses are provided for each partition (in hexadecimal format), each with the corresponding start logical address and the corresponding end logical address. For example, partition 0 begins at logical address 0 and ends at 0x000F_FFFF, partition 1 begins at logical address 0x0010_0000 and ends at 0x001F_FFFF, partition 2 begins at 0x0020_000 and ends at 0x002F_FFFF, etc.

Under each identified segment, in the assignment section of the table, a "1" is provided to indicate that, based on the provided configuration information, the corresponding partition is assigned to that segment. Referring to the first identified segment in the table, fixed segment A, the partitions for segment A is provided as two (e.g. OTA_config[0: 7] indicates two). Therefore, two partitions are assigned to fixed segment A, as indicated by the "1" at the intersection of partition 0 and segment A and at the intersection of partition 1 and segment A. Note that partitions are assigned starting with the lowest partition (partition 0 starting at the lowest logical start address, 0), and moving consecutively up towards the highest partition (partition 7 starting at the highest logical start address 0x0070_0000). Therefore, referring to the next identified segment, swappable segment B00, the partitions for segment B00 is provided as two (e.g., OTA_config[8:15] indicates two). Continuing up with the next higher partition after the partitions of fixed segment A, the next two partitions are assigned to swappable segment B00, as indicated by the "1" at the intersection of partition 2 and segment B00 and at the intersection of partition 3 and segment B00. As described above in reference to FIG. 4, the number of partitions for B01 is equal to that of B00. The next two partitions are therefore assigned to swappable segment B01, as indicated by the "1" at the intersection of partition 4 and segment B01 and at the intersection of partition 5 and segment B01. The next identified segment, B02, corresponds to the B02 enable bit. In the illustrated embodiment, the B02 is asserted (TRUE), as indicated by the "1" underneath B02 in the table. With B02 enabled, the next two partitions are assigned to swappable segment B02, as indicated by the "1" at the intersection of partition 6 and segment B02 and at the intersection of partition 7 and segment B02.

In addition to assigning partitions to a fixed or swappable segment, an OTA indicator is provided with each swappable segment to identify the active and passive swappable segments of the series, which include active and passive partitions, respectively. The active partitions store the active firmware image, and the passive partitions store the backup firmware images. For example, referring to segment B00 of FIG. 5, the corresponding OTA indicator, which is stored in the last partition (partition 3) of B00 at logical address 0x003F_FFF7, identifies partitions 2 and 3 of B00 as being "present" as active partitions (making B00 the active swappable segment), and identifies partitions 4 and 5 of B01 and partitions 6 and 7 of enabled B02 as each being "present" as passive partitions (making B01 and B02 passive swappable segments). The OTA indicators, representing the purpose of each segment within a series of swappable segments, can hold, e.g., a 64-bit address value in which the highest number denotes the active segment and the lower numbers in descended order denote a first and other backup images.

Note that in the example of FIG. 5, the only OTA_indicators valid for memory mapping are in partitions 3, 5, and 7 (e.g. OTA_indicators 3, 5, and 7) because they are the OTA_indicators stored in the last partitions of the swappable segments (e.g. B00, B01, and B02). That is, only those OTA_indicators within the last partition of a swappable segment define the status of the entire swappable segment (e.g. whether it is active, a passive first backup, passive second backup, etc.) Also, more bits may be used for the OTA indicators if additional numbers are needed for additional backup images, if present. Note that in this example, swappable segments are assigned to each of B00, B01, and B02 which correspond to core 0, however, no swappable segments are assigned to core 1 (as indicated by the "0" under each of B10 and B11 and by B12 being disabled). Therefore, if a particular segment type is not needed, such as the swappable segments for core 1 in this example, it can be skipped.

Note that the OTA indicators are also used to control arrangement of the swappable segments (e.g. B00/B01/B02) within the logical memory address space. For example, a swappable segment identified as active is placed in the bottom address space for the corresponding core. That is, with B00 identified as an active swappable segment, it is virtually placed at the bottom logical address space for the series of segments corresponding to core 0 (at 0x0020_0000 to 0x003F_FFFF), and the passive or backup swappable segments B01 and B02 are virtually placed on top of B00 (at 0x0040_0000 to 0x007F_FFFF).

Code memory 24 also includes at least one boot header to define boot addresses for the cores. The boot headers are fixed by design and are stored in the logical address space of the SoC. In the examples of FIGS. 5 and 6, there are two boot headers in the logical address space, one at address 0 and another at 0x0040_0000, in which either or both of these boot header addresses contain relevant boot information. Security core 30 can scan for boot headers starting from the lower logical address and use the content from the first valid boot header for starting operation of the cores. The cores will always execute from addresses provided by the first valid boot header but swappable memory segments in the logical address space can be re-arranged by NVM controller 36 based on the OTA indicators prior to the cores beginning execution.

FIG. 6 illustrates how configuration information with different values provided for each segment results in a different configuration of memory 24 as compared to the configuration information of FIG. 5. Note that the table of FIG. 6 is organized analogously to the table of FIG. 5. In the example of FIG. 6, fixed segment A is also assigned two partitions, partitions 0 and 1. However, the number of partitions for swappable segment B00 is identified as one, in which the next one partition after segment A, partition 2, is assigned to B00. Since B01 equals B00, the next one partition, partition 3, is assigned to B01. Since B02 is also enabled, the next one partition, partition 4, is assigned to B02. In this example, the same values are provided for B10, B11, and B12. Therefore, continuing after segment B02, partition 5 is assigned to B10, partition 6 to B11, and partition 7 to B12. The OTA indicators, each located at a particular logical address of the corresponding partition, indicates whether the corresponding swappable segment is designated as active or passive. In this example of FIG. 6, each of partitions 2-7 is a last partition within the swappable segment (B00, B01, B02, B10, B11, and B12, respectively). Therefore, each of OTA_indicators 2-7 provide meaningful values describing each corresponding segment and is therefore used for memory mapping. The corresponding boot headers are also provided in FIG. 6, similar to the example of FIG. 5.

Figure 7:
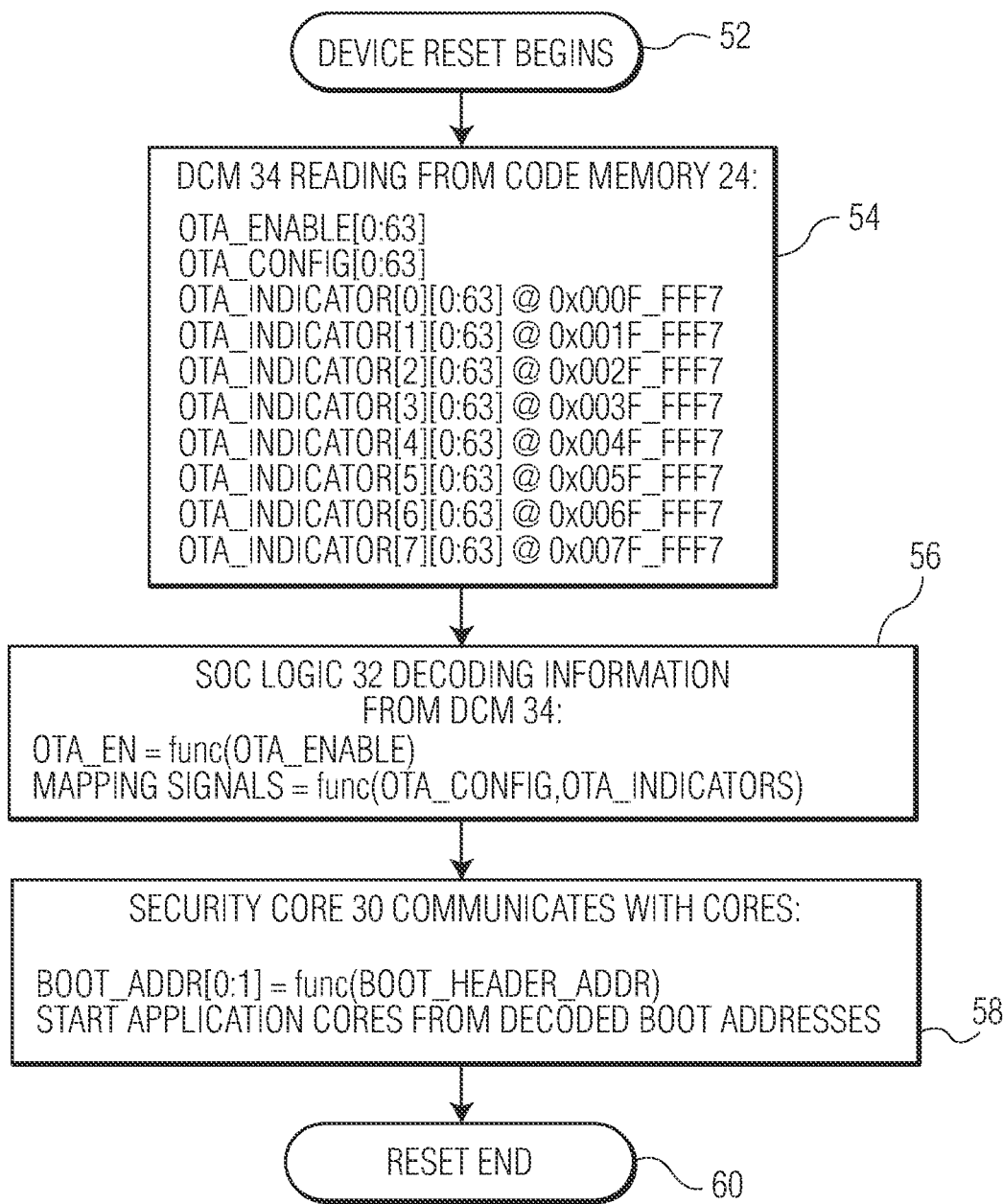
FIG. 7 illustrates, in flow diagram form, a method of operating the device of FIG. 3, in accordance with one embodiment of the present invention.

The use of the configuration information within the example of SoC 10 provided in FIG. 3 will be described in reference to the flow diagram of FIG. 7. FIG. 7 illustrates a method 50 of operating SoC 10 of FIG. 3 in accordance with one embodiment of the present invention. Method 50 begins in block 52, in which a device reset for SoC 10 begins (i.e. SoC 10 enters reset). Next (in block 54), DCM 34 reads configuration information from memory 24, which includes reading OTA_enable[0:63] and OTA_config[0:63] from the predetermined addresses of configuration area 40 and OTA_indicators (0-7)[0:63] from the predetermined addresses in each of partitions 0-7. For example, for partition 0, the corresponding OTA_indicator is read from 0x000F_FFF7, for partition 1, the corresponding OTA_indicator is read from 0x001F_FFF7, etc. Note that out of the eight OTA_indicators, only those stored in the last partition of each swappable segment hold a meaningful value about the swappable segment.

SoC logic 32 then decodes (in block 56) the configuration information from DCM 34. This includes SoC logic 32 decoding OTA_enable[0:63] to provide OTA_en to NVM controller 36 and decoding OTA_config[0:63] to provide the partition mapping signals to NVM controller 36 so that NVM controller can implement the logical mapping of the partitions. For example, based on the configuration information, NVM controller 36 provides partition assignments in the logical address space of memory 24. In the examples used in FIGS. 5 and 6, this includes NVM controller 36 mapping partition 0 to 0-0x00FF_FFF, partition 1 to 0x0010_0000-0x001F_FFFF, etc. This is done during device reset because this should be done prior to the cores operating. Therefore, OTA_en is decoded as a function of OTA_e- nable, while the mapping signals are decoded as a function of OTA_config and OTA_indicators.

Next, in block 58, security core 30 provides a boot address (boot_addr[0:1]) to each core, core 0 and core 1, which is read from fixed addresses boot_header_addr[0:1] (provided to security core 30). As indicated above, the boot headers are fixed by design, and security core 30 can scan for boot headers starting from the lower logical address and uses the contents from the first valid boot header. In the examples of FIGS. 5 and 6, the first valid boot header may correspond to boot header address 0. Security core 30 then starts the application cores (core 0 and core 1) from addresses read from the first valid boot header. At this point, reset ends at block 60 (i.e. SoC 10 exits reset). Operation of SoC 10 after completion of reset uses the resulting configuration for memory 24 which was set up during reset.

With any OTA firmware update, with OTA_enable enabled, new configuration information can be loaded into configuration area 40, and upon a reset, SoC 10 will operate with the new configuration. By allowing configurations with a swappable active segment and two or more swappable backup segments, an OTA firmware update can be used to provide an update of the active firmware image as well as two backup firmware images.

Figure 8:
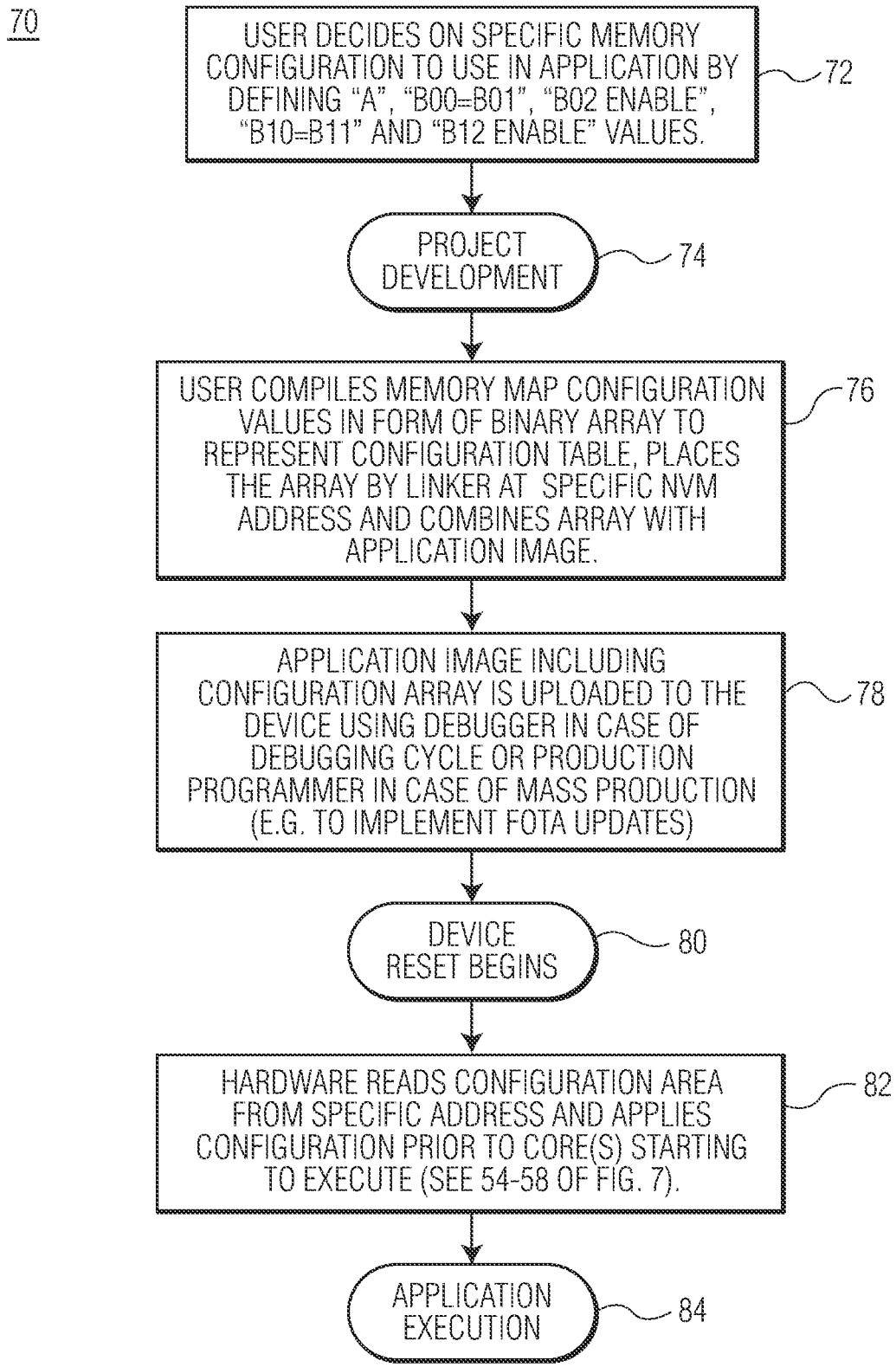
FIG. 8 illustrates, in flow diagram form, a method of performing a FOTA update for the device of FIG. 3, in accordance with one embodiment of the present invention.

FIG. 8 illustrates, in flow chart form, a method 70 for performing an OTA update for a device (such as for SoC 10 of FIG. 3) with a corresponding desired configuration for the code memory, in accordance with one embodiment of the present invention. Method 70 begins with block 72 in which a user decides on a specific memory configuration desired for use in an application by defining the memory configuration values for A, B00 (in which B00=B01), B02 enable, B10 (in which B10=B11), and B12 enable. In block 74, project development by the user is performed using the specific memory configuration desired for the application. For example, during this project development, firmware updates for the device can be developed.

After the project development, at block 76, the user compiles the memory configuration values in the form of a binary array to represent a configuration table. This array is placed, by a linker, at a specific address of the NVM (e.g. the code memory) and combines the array with the application image. Next, in block 78, the resulting application image, including the configuration array, is uploaded to the device using, for example, the debugger in the case of a debugging cycle or the production programmer in the case of mass production. This resulting application image can be transferred over the air to the device for the upload and storage into memory 24. In this manner, FOTA updates can be implemented. With the FOTA updates, the configuration areas in the code memory of the devices (such as configuration area 40) can be updated, as needed, to provide the specific memory configuration with which the image was created. Also, for the FOTA update for a core of SOC 10, the firmware image for the FOTA update is stored to the first swappable segment as the active firmware image, to the second swappable segment as a first backup firmware image, and, when enabled, to the third swappable segment as a second backup firmware image.

After the FOTA updates on a device, the device is reset (at block 80) in order to implement the updates. In block 82, in response to the device entering reset, hardware on the device (e.g. the DCM and the SoC logic) reads the configuration area from a specific address of the NVM (the code memory) and applies the configuration prior to any cores starting execution. For example, these steps include the steps described in blocks 54-58 of FIG. 7. Device reset is complete, and application execution can then begin at block 84. Note that the method of FIG. 8 can be repeated with each subsequent FOTA update.

Therefore, by now it can be appreciated how the NVM of a smart device, such as a multicore device, can implement a variety of memory configurations which fit to any FOTA update use case. For example, the memory configuration for a firmware update can allow for one active firmware image and two or more backup firmware images by allowing a user to define memory segments (fixed or swappable), as needed, to support the desired firmware setup. The user can also exclude any type of segment if not required and can adjust the number of partitions within the segments. The memory configuration selected by the user can be encoded directly into the application firmware that is uploaded to the device and applied after device power on reset (as described in reference to FIG. 8).

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [0:7]" or "conductors [0:7] of bus 60" indicates the eight lower order conductors of bus 60, and "address bits [0:7]" or "ADDRESS [0:7]" indicates the eight lower order bits of an address value. The symbol "0x" preceding a number indicates that the number is represented in its hexadecimal or base sixteen form. The symbol "%" preceding a number indicates that the number is represented in its binary or base two form.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, fewer or additional configuration information or parameters can be provided as part of the memory configuration template. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a System on Chip (SoC) includes a first core coupled to an interconnect; a second core coupled to the interconnect; a memory coupled to the interconnect, wherein the memory comprises a plurality of evenly sized partitions; and storage circuitry configured to store memory configuration information, wherein the memory configuration information defines a memory configuration and is configured to indicate a series of swappable segments for each core of the SoC by indicating, for each core: a first number of partitions of the memory assigned to each of a first swappable segment and a second swappable segment for the core, the first swappable segment designated as an active segment and the second swappable segment designated as a first backup segment; and an enable indicator to indicate whether or not to assign the first number of partitions to a third swappable segment designated as a second backup segment. In one aspect, for each core, the active segment is configured to store an active firmware image for the SoC, the first backup segment is configured to store a first backup firmware image for the active firmware image, and the second backup segment is configured to store a second backup firmware image for the active firmware image. In another aspect, the memory configuration information is configured to indicate the series of swappable segments for each core of the SoC by further indicating, for each core, a second number of partitions assigned to a fixed segment. In another aspect, the memory configuration information is configured to be updated by an over-the-air firmware (OTA) update which can change values for any of the first number and the enable indicator for each core. In another aspect, for each swappable segment in each series of swappable segments, an OTA indicator stored at a predetermined address of a last partition assigned to the swappable segment defines the swappable segment as active or passive. In a further aspect, the SoC further includes SoC logic; and a device configuration module (DCM) configured to, in response to beginning a reset of the SoC, provide the memory configuration information and the OTA indicators to the SoC logic, the SoC logic configured to provide partition mappings to a controller of the memory to implement the defined memory configuration. In yet a further aspect, for each of the series of swappable segments, the SoC logic maps the first swappable segment to a first logic address range of the memory, the second swappable segment to a second logic address range, adjacent the first logic address range, and the third swappable segment, if enabled by the enable indicator, to a third logic address range, adjacent the first logic address range. In yet an even further aspect, the reset ends after the SoC logic provides the partition mappings to the controller.

In another embodiment, in a System on Chip (SoC) having multiple cores and a memory divided into partitions, accessible by each of the multiple cores, a method includes receiving a first over-the-air (OTA) firmware update, wherein first OTA firmware update includes first memory configuration information for a first memory configuration; storing the first memory configuration information into storage circuitry of the SoC, wherein the first memory configuration information defines a series of swappable segments for each corresponding core of the SoC by indicating, for each corresponding core: a first number of partitions of the memory assigned to each of a first swappable segment and a second swappable segment for the corresponding core; and a first enable indicator to selectively enable a third swappable segment for the corresponding core; storing, for each corresponding core, a firmware image from the first OTA firmware update to each of the first swappable segment, second swappable segment, and, when enabled, the third swappable segment, wherein the firmware image of the first swappable segment is an active firmware image for the corresponding core and the firmware image of the second swappable segment and of the third swappable segment, when enabled, are backup firmware images for the corresponding core; beginning reset of the SoC; in response to beginning the reset, hardware in the SoC obtains the first memory configuration information for each corresponding core from the storage circuitry and provides memory mappings to a controller of the memory to implement the first memory configuration; and after completing the reset, initiating execution by at least one of the multiple cores. In one aspect, the method further includes receiving a second over-the-air (OTA) firmware update, wherein second OTA firmware update includes second memory configuration information for a second memory configuration; storing the second memory configuration information into storage circuitry of the SoC, wherein the second memory configuration information defines a series of swappable segments for each corresponding core of the SoC by indicating, for each corresponding core: a second number of partitions of the memory assigned to each of a fourth swappable segment and a fifth swappable segment for the corresponding core; and a second enable indicator to selectively enable a sixth swappable segment for the corresponding core; and storing, for each corresponding core, a firmware image from the second OTA firmware update to each of the fourth swappable segment, fifth swappable segment, and, when enabled, the sixth swappable segment, wherein the firmware image of the fourth swappable segment is the active firmware image for the corresponding core and the fifth firmware image of the second swappable segment and of the sixth swappable segment, when enabled, are backup firmware images for the corresponding core. In a further aspect, the method further includes beginning a second reset of the SoC; in response to beginning the second reset, hardware in the SoC obtains the second memory configuration information for each corresponding core from the storage circuitry and provides memory mappings to the controller of the memory to implement the second memory configuration; and after completing the second reset, initiating execution by at least one of the multiple cores. In yet a further aspect, the second memory configuration is different from the first memory configuration. In another further aspect, the series of swappable elements for a first core of the multiple cores is defined differently by the second memory configuration information as compared to the first memory configuration information. In a further aspect, first enable indicator for the first core defined by the first configuration information is asserted to enable the third swappable segment, but the second enable indicator for the first core define by the second configuration information is negated to not enable the sixth swappable segment. In another of the another embodiment, the method further includes, in response to beginning the reset, obtaining OTA indicators from the partitions of the memory, wherein each OTA indicator identifies a corresponding partition as active or passive, wherein the providing the memory mappings to the controller is performed using the first configuration information and the OTA indicators. In a further aspect, the OTA indicators are each stored in a predetermined address of the corresponding partition.

In yet another embodiment, a System on Chip (SoC) includes multiple cores coupled to an interconnect; a memory coupled to the interconnect, wherein the memory comprises a plurality of partitions, wherein each partition is configured to store an over-the-air (OTA) indicator at a predetermined address of the partition which defines the partition as an active partition or a passive partition; and storage circuitry configured to store memory configuration information, wherein the memory configuration information defines a memory configuration and is configured to indicate a series of swappable segments for each core of the SoC by indicating, for each core: a first number of partitions of the memory assigned to each of a first swappable segment and a second swappable segment for the core, the first swappable segment designated as an active segment and the second swappable segment designated as a first backup segment; and an enable indicator to selectively enable a third swappable segment as a second backup segment for the core; SoC logic; and a device configuration module (DCM) configured to, in response to the SoC entering reset, provide the memory configuration information and the OTA indicators to the SoC logic, the SoC logic configured to provide partition address mappings to a controller of the memory, based on the memory configuration information and the OTA indicators, to implement the defined memory configuration prior to exiting reset. In one aspect, for each core, the active segment is configured to store an active firmware image for the SoC, the first backup segment is configured to store a first backup firmware image for the active firmware image, and, when the third swappable segment is enabled, the second backup segment is configured to store a second backup firmware image for the active firmware image. In another aspect, the memory configuration information is configured to indicate the series of swappable segments for each core of the SoC by further indicating, for each core, a second number of partitions assigned to a fixed segment. In yet another aspect, the memory configuration information is configured to be updated by an over-the-air firmware (FOTA) update which can update the memory configuration information, wherein the updated memory configuration information defines a new memory configuration that is different from the memory configuration.

The invention claimed is:

1. A System on Chip (SoC), comprising:
a first core coupled to an interconnect;
a second core coupled to the interconnect;
a memory coupled to the interconnect, wherein the memory comprises a plurality of evenly sized partitions; and
storage circuitry configured to store memory configuration information, wherein the memory configuration information defines a memory configuration and is configured to indicate a series of swappable segments for each core of the SoC by indicating, for each core:
a first number of partitions of the memory assigned to each of a first swappable segment and a second swappable segment for the core, the first swappable segment designated as an active segment and the second swappable segment designated as a first backup segment; and
an enable indicator to indicate whether or not to assign the first number of partitions to a third swappable segment designated as a second backup segment.

2. The SoC of claim 1, wherein, for each core, the active segment is configured to store an active firmware image for the SoC, the first backup segment is configured to store a first backup firmware image for the active firmware image, and the second backup segment is configured to store a second backup firmware image for the active firmware image.

3. The SoC of claim 1, wherein the memory configuration information is configured to indicate the series of swappable segments for each core of the SoC by further indicating, for each core, a second number of partitions assigned to a fixed segment.

4. The SoC of claim 1, wherein the memory configuration information is configured to be updated by an over-the-air firmware (OTA) update which can change values for any of the first number and the enable indicator for each core.

5. The SoC of claim 1, wherein, for each swappable segment in each series of swappable segments, an OTA indicator stored at a predetermined address of a last partition assigned to the swappable segment defines the swappable segment as active or passive.

6. The SoC of claim 5, further comprising:
SoC logic; and
a device configuration module (DCM) configured to, in response to beginning a reset of the SoC, provide the memory configuration information and the OTA indicators to the SoC logic, the SoC logic configured to provide partition mappings to a controller of the memory to implement the defined memory configuration.

7. The SoC of claim 6, wherein, for each of the series of swappable segments, the SoC logic maps the first swappable segment to a first logic address range of the memory, the second swappable segment to a second logic address range, adjacent the first logic address range, and the third swappable segment, if enabled by the enable indicator, to a third logic address range, adjacent the first logic address range.

8. The SoC of claim 7, wherein the reset ends after the SoC logic provides the partition mappings to the controller.

9. In a System on Chip (SoC) having multiple cores and a memory divided into partitions, accessible by each of the multiple cores, a method comprises:
receiving a first over-the-air (OTA) firmware update, wherein first OTA firmware update includes first memory configuration information for a first memory configuration;
storing the first memory configuration information into storage circuitry of the SoC, wherein the first memory configuration information defines a series of swappable segments for each corresponding core of the SoC by indicating, for each corresponding core:
a first number of partitions of the memory assigned to each of a first swappable segment and a second swappable segment for the corresponding core; and
a first enable indicator to selectively enable a third swappable segment for the corresponding core;
storing, for each corresponding core, a firmware image from the first OTA firmware update to each of the first swappable segment, second swappable segment, and, when enabled, the third swappable segment, wherein the firmware image of the first swappable segment is an active firmware image for the corresponding core and the firmware image of the second swappable segment and of the third swappable segment, when enabled, are backup firmware images for the corresponding core;
beginning reset of the SoC;
in response to beginning the reset, hardware in the SoC obtains the first memory configuration information for each corresponding core from the storage circuitry and provides memory mappings to a controller of the memory to implement the first memory configuration; and
after completing the reset, initiating execution by at least one of the multiple cores.

10. The method of claim 9, further comprising:
receiving a second over-the-air (OTA) firmware update, wherein second OTA firmware update includes second memory configuration information for a second memory configuration;
storing the second memory configuration information into storage circuitry of the SoC, wherein the second memory configuration information defines a series of swappable segments for each corresponding core of the SoC by indicating, for each corresponding core:
a second number of partitions of the memory assigned to each of a fourth swappable segment and a fifth swappable segment for the corresponding core; and
a second enable indicator to selectively enable a sixth swappable segment for the corresponding core; and
storing, for each corresponding core, a firmware image from the second OTA firmware update to each of the fourth swappable segment, fifth swappable segment, and, when enabled, the sixth swappable segment, wherein the firmware image of the fourth swappable segment is the active firmware image for the corresponding core and the fifth firmware image of the second swappable segment and of the sixth swappable segment, when enabled, are backup firmware images for the corresponding core.

11. The method of claim 10, further comprising:
beginning a second reset of the SoC;
in response to beginning the second reset, hardware in the SoC obtains the second memory configuration information for each corresponding core from the storage circuitry and provides memory mappings to the controller of the memory to implement the second memory configuration; and
after completing the second reset, initiating execution by at least one of the multiple cores.

12. The method of claim 11, wherein the second memory configuration is different from the first memory configuration.

13. The method of claim 10, wherein the series of swappable elements for a first core of the multiple cores is defined differently by the second memory configuration information as compared to the first memory configuration information.

14. The method of claim 13, wherein the first enable indicator for the first core defined by the first configuration information is asserted to enable the third swappable segment, but the second enable indicator for the first core define by the second configuration information is negated to not enable the sixth swappable segment.

15. The method of claim 9, further comprising:
in response to beginning the reset, obtaining OTA indicators from the partitions of the memory, wherein each OTA indicator identifies a corresponding partition as active or passive, wherein the providing the memory mappings to the controller is performed using the first configuration information and the OTA indicators.

16. The method of claim 15, wherein the OTA indicators are each stored in a predetermined address of the corresponding partition.

17. A System on Chip (SoC), comprising:
multiple cores coupled to an interconnect;
a memory coupled to the interconnect, wherein the memory comprises a plurality of partitions, wherein each partition is configured to store an over-the-air (OTA) indicator at a predetermined address of the partition which defines the partition as an active partition or a passive partition; and
storage circuitry configured to store memory configuration information, wherein the memory configuration information defines a memory configuration and is configured to indicate a series of swappable segments for each core of the SoC by indicating, for each core:
a first number of partitions of the memory assigned to each of a first swappable segment and a second swappable segment for the core, the first swappable segment designated as an active segment and the second swappable segment designated as a first backup segment; and an enable indicator to selectively enable a third swappable segment as a second backup segment for the core;

SoC logic; and a device configuration module (DCM) configured to, in response to the SoC entering reset, provide the memory configuration information and the OTA indicators to the SoC logic, the SoC logic configured to provide partition address mappings to a controller of the memory, based on the memory configuration information and the OTA indicators, to implement the defined memory configuration prior to exiting reset.

18. The SoC of claim 17, wherein, for each core, the active segment is configured to store an active firmware image for the SoC, the first backup segment is configured to store a first backup firmware image for the active firmware image, and, when the third swappable segment is enabled, the second backup segment is configured to store a second backup firmware image for the active firmware image.

19. The SoC of claim 17, wherein the memory configuration information is configured to indicate the series of swappable segments for each core of the SoC by further indicating, for each core, a second number of partitions assigned to a fixed segment.

20. The SoC of claim 17, wherein the memory configuration information is configured to be updated by an over-the-air firmware (FOTA) update which can update the memory configuration information, wherein the updated memory configuration information defines a new memory configuration that is different from the memory configuration.

* * * * *